United States Patent [19]

Roberto

[11] Patent Number: 5,372,853
[45] Date of Patent: Dec. 13, 1994

[54] TREATMENT TO IMPROVE CORROSION RESISTANCE OF AUTODEPOSITED COATINGS OF METALLIC SURFACES

[75] Inventor: Oscar E. Roberto, Farmington Hills, Mich.

[73] Assignee: Henkel Corporation, Plymouth Meeting, Pa.

[21] Appl. No.: 102,660

[22] Filed: Aug. 5, 1993

[51] Int. Cl.$^5$ .............................................. B05D 1/18
[52] U.S. Cl. .................................. 427/337; 427/340; 427/419.8; 427/435; 148/240; 148/247
[58] Field of Search ................ 427/419.8, 337, 340, 427/435; 148/240, 247

[56] References Cited

U.S. PATENT DOCUMENTS

| | | | |
|---|---|---|---|
| 3,964,936 | 6/1976 | Das | 148/6.27 |
| 4,370,177 | 1/1983 | Frelin et al. | 148/6.27 |
| 4,617,068 | 10/1986 | King | 148/6.14 R |
| 4,636,264 | 1/1987 | Schellenberg et al. | 148/6.2 |
| 4,636,265 | 1/1987 | Fischer et al. | 148/6.15 R |
| 4,800,106 | 1/1989 | Broadbent | 427/338.1 |
| 4,853,285 | 8/1989 | Sobata et al. | 428/336 |
| 4,971,636 | 11/1990 | Watanabe et al. | 148/265 |
| 5,030,323 | 7/1991 | Awad | 156/665 |
| 5,089,064 | 2/1992 | Reghi | 148/247 |
| 5,164,234 | 11/1992 | Siebert | 427/419.8 |
| 5,242,714 | 9/1993 | Steele et al. | 427/379 |

*Primary Examiner*—Shrive Beck
*Assistant Examiner*—Brian K. Talbot
*Attorney, Agent, or Firm*—Ernest G. Szoke; Wayne C. Jaeschke; Norvell E. Wisdom, Jr.

[57] ABSTRACT

A process of retaining or enhancing corrosion resistance of autodeposited coatings on metallic surfaces by contacting the uncured coating on the metallic surface with a rinse solution containing hydrofluorozirconic acid or a salt thereof, such as nickel or cobalt salt. The metallic surface may be cold rolled steel or galvanized steel. The resinous autodeposited coatings are poly{vinylidene chloride} polymers. Copolymers containing at least 50% by weight poly{vinylidene chloride} are suitable. Because the protective properties of the autodeposited coatings are improved on both types of steel, both may be processed simultaneously, providing practical and economic advantages.

20 Claims, No Drawings

TREATMENT TO IMPROVE CORROSION RESISTANCE OF AUTODEPOSITED COATINGS OF METALLIC SURFACES

BACKGROUND OF THE INVENTION

This invention relates to the treatment of autodeposited coatings in order to retain longer or to enhance corrosion resistance of the coatings on metallic surfaces, particularly ferriferrous articles, including zinc coated (galvanized) steel.

STATEMENT OF RELATED ART

Autodeposition is a generic term used to describe the deposition of a uniform organic film on a clean metal surface without the use of electric current in the deposition process. Autodeposition involves the use of an aqueous resin containing coating composition of relatively low solids concentration, usually 5 to 12%, normally less than 10%, to form a coating of high solids concentration, usually greater than 10%, on a metallic surface immersed therein, with the coating increasing in thickness or weight the longer the time the metallic surface is immersed in the coating composition.

Autodeposition composition can be used to form coatings which have good aesthetic properties and which protect the underlying metallic substrate from being degraded, i.e. corroded by water. Many applications however require the autodeposited coating have particularly good properties for use. Various means have been developed to improve the properties of autodeposited coatings including:

(a) chemical pretreatment of the metallic surface prior to forming the coatings;
(b) selection of specific particular resins which form the coating and
(c) chemical post-treatment of the freshly formed or uncured coating.

U.S. Pat. No. 4,800,106, the description of which is hereby incorporated herein by reference, describes a number of references dealing with various treatments of uncured autodeposited coatings including the treatment of freshly formed autodeposited coatings with acidic, aqueous solution of one or more chromium compounds to improve corrosion resistance. While chemical treatments such as rinses, following autodeposition coatings, may provide for improved corrosion resistance, gloss or other properties, oftentimes the treatment creates problems such as waste disposal problems. Thus the use of chromium containing compounds in post-treatment raises a disposal and environmental problem or disadvantage in that the chromium must first be removed or otherwise treated before disposal to waste.

In the past, cold rolled steel and galvanized steel often required different auto-deposited coatings, requiring different post-treatment, i.e. different rinses for the coatings. An object of the present invention is to provide a process which includes a rinse which will retain, or improve, the corrosion resistance properties of the autodeposited coating employing non-chromium containing materials which are environmentally friendly, raising no disposal problems.

A further object of the present invention is to provide a single rinse for coatings on both cold rolled steel and galvanized steel. In this way a single rinse may be used for both steel types and coatings thereon so that simultaneous processing of cold rolled steel and galvanized steel substrates may be carried out.

DESCRIPTION OF THE INVENTION

Other than in the operating example or where otherwise indicated, all numbers expressing quantities of ingredients or reaction conditions used herein are to be understood as modified in all instances by the term "about."

In accordance with this invention, corrosion resistance is retained, or improved, by treating the uncured coating on the metallic substrate with a hydrofluorozirconic compound, either the acid per se or salts thereof, preferably the cobalt or nickel salts thereof. After treatment of the coated metallic substrate with the hydrofluorozirconic acid (either the acid or salt), rinse, the coating may optionally be rinsed with water, preferably deionized water, and then cured in a low temperature oven at a temperature appropriate for the specific coating deposited on the metallic substrate.

In the overall process of the present invention the ferriferrous substrate is cleaned, generally using an alkaline, commercially available cleaner. The cleaning is carried out either by spray application, or immersion or combination of both, after which the coated workpiece is rinsed with water to remove any residual cleaning solution, prior to deposition of the coating. The autodeposited film is preferably applied by immersion of the substrate into a coating bath containing the desired polymer latex, emulsion or dispersion for a time sufficient to coat the substrate with a film to a thickness from about 0.3 up to about 1.0 mil, preferably in the range of about 0.6 to about 1.0 mil. Because the autodeposition process is driven chemically, rather than electrically, it coats wherever the solution wets the surface of the substrate depositing a relatively uniform coating on even intricate or complex shapes or designs of the substrate. The time and temperature of treatment will vary depending on the nature of the particular resins comprising the coating. After the coating is deposited, a rinse is applied in the present invention to retain, or improve, the corrosion resistance of the coating.

The autodeposition coatings useful in the present invention are poly{vinylidene chloride} polymers, preferably copolymers containing at least about 50% by weight of poly{vinylidene chloride}. The copolymers can be prepared by copolymerizing (a) vinylidene chloride monomer with (b) monomers such as methacrylic acid, methyl methacrylate, acrylonitrile and vinyl chloride and (c) a water soluble ionic material such as sodium sulfoethyl methacrylate. Such copolymers are more specifically described in U.S. Pat. No. 5,164,234 at column 6, lines 28–59, the disclosure of which is hereby incorporated herein by reference.

The rinse employed in the present invention, which follows after application of the poly{vinylidene chloride} autodeposited coating, provides for retention and enhancement of the corrosion resistance of the deposited coating. The rinse employed herein is an aqueous solution containing from about 0.05 to about 20%, preferably about 0.05 to about 5% by weight of hydrofluorozirconic acid, or a salt thereof, preferably a cobalt or nickel salt.

The results achieved by the present invention are effective on both cold rolled steel and galvanized steel, thereby allowing the two types to be processed together.

The poly{vinylidene chloride} resin coating is applied from an aqueous, acidic solution of solids concentration of about 10%, in the conventional manner, typically by immersion, for a time sufficient to cause the resin polymer particles to deposit on the metallic surface in a continuous film to a dry thickness of about 0.3 mil to about 1.0 mil, preferably about 0.6 to about 1.0 mil. Typically, about 40 to about 120 seconds will be sufficient at immersion bath temperatures of about 20° to about 22° C.

The coated metallic article is typically rinsed with tap water or deionized water by immersion prior to treatment with the hydrofluorozirconic acid rinse. The aqueous acid rinse solution is preferably adjusted to a pH of about 3 to 5 prior to treatment. The rinse is preferably and typically applied by immersion in the rinse solution containing about 0.05 to about 5.0% by weight of the hydrofluorozirconic acid compound for about 40 to about 120 seconds, preferably about 60 to about 90 seconds. The immersion bath temperature will again typically be about 20°-22° C., although a temperature range of about 10° to about 35° C. may be employed.

Subsequent to the rinse treatment, the coated article is again optionally rinsed with water, either plain tap water or deionized water, prior to being cured at an elevated temperature so selected that the protective properties of the coating are fully developed but not adversely affected. The temperature and time of treatment will depend on the nature of the particular resin in the autodeposited coating and the thickness of the coating. Exemplary conditions with the poly{vinylidene chloride} coatings employed in the present invention will vary from a temperature above about 22° C. up to about 120° C. for times ranging from a few seconds, i.e. about 5 seconds, up to about 10 to about 30 minutes, dependent on the mass of the coated article. Effectively, the coating is baked for a period of time until the metallic surface has reached the temperature of the heated environment, typically in a forced air baking oven.

The dried, cured articles are found to retain excellent, and even enhanced corrosion resistance when tested in soak tests or the neutral salt spray ("NSS") test, such as ASTM B-117 and scab corrosion cycles.

To further illustrate the various objects and advantages of the present invention, the following examples, in which all parts and percentages are by weight unless otherwise indicated, are provided. It is understood that their purpose is entirely illustrative and in no way intended to limit the scope of the invention.

EXAMPLE 1

This example illustrates the preparation of a metallic surface having an autodeposited resinous coating. The metallic surface comprised steel panels, both cold rolled steel (CRS) and zinc galvanized steel (GS) panels, which were cleaned with a conventional alkaline cleaner composition and rinsed with water prior to being coated by immersion in the autodepositing composition at ambient temperature (about 21° C.) for about 90 seconds. The autodepositing immersion bath had the following composition: 60 grams per liter (hereinafter abbreviated as "g/L") of internally stabilized copolymer of vinylidene chloride, 2.5 g/L of carbon black, 0.4 g/L of HF, 28 g/L of ferric iron, and the balance water.

EXAMPLE 2

In this example, the uncured coated panels from example 1 are treated with a rinse immersion bath after first being rinsed with water. The rinse without cobalt cations contained 0.5% by weight of $H_2ZrF_6$ and was adjusted to the pH shown in the following tables with ammonia if needed. In the examples employing the cobalt salt of hydrofluorozirconic acid, the concentration is shown in the tables below; the pH was 3.5 for all the concentrations shown.

After immersion in the rinse bath for one minute, the panels were then rinsed with water (deionized) and the panels were then cured for 20 minutes in an oven at a temperature of 105° C.

EXAMPLE 3

This example illustrates the results of corrosion resistance testing of various panels. Table 1 below illustrates salt spray performance and cyclic scab performance on galvanized steel, and Tables 2-7 indicate performance on other tests as noted.

The letters "GM" and the numbers and letters immediately following these letters in the headings of Tables 2-7 refer respectively to the General Motors Corporation and to various specific corrosion tests that are part of performance specifications at that company. Test details are readily available from General Motors. Briefly, the tests reported here are described as follows:
1. Cyclic Corrosion—GM 9511P After preparation (1) the samples are heated in an oven at 60° C. for 1 hour followed by (2) 30 minutes at −25° C. The samples are then (3) immersed in a 5%

TABLE 1

| Rinse | Concentration | pH | Corrosion Test Ratings (Paint Delamination from Scribe, mm) | |
|---|---|---|---|---|
| | | | NSS (336 hr) | 20 Cycles Scab |
| $H_2ZrF_6$ | 0.5% | 3 | 0–2 | |
| $H_2ZrF_6$ | 0.5% | 4 | 0–2 | |
| $H_2ZrF_6$ | 0.5% | 5 | 0–2 | 1.5 |
| $CoZrF_6$ | 4.5 g/L | 3.5 | 0–2 | 1.5 |
| $CoZrF_6$ | 9.0 g/L | 3.5 | 0–2 | 0.8 |
| $CoZrF_6$ | 18 g/L | 3.5 | 0–1 | 0.6 |

TABLE 2

| | (20 Cycles GM 9511 on Cold Rolled Steel) | | | | | |
|---|---|---|---|---|---|---|
| | Coating Thickness | Total Width Creepback (mm) | | | Gravel Rating | |
| Rinse | (mils) | Average | Maximum | Minimum | Impact Damage* | After 20 Cycles |
| 0.5% $H_2ZrF_6$ | 0.9 | 2.8 | 5.9 | 1.5 | 9 | 10% |
| pH 5 | 0.8 | 3.3 | 6.0 | 1.0 | 9 | rusted |
| $CoZrF_6$ | 0.9 | 3.7 | 5.9 | 1.5 | 9 | 10% |
| 4.5 g/L | 0.9 | 2.8 | 8.2 | 1.0 | 9 | rusted |

*Impact damage was measured as specified in GM 9508 P.

TABLE 3

(20 Cycles GM 9511 P on Galvanized Steel)

| Rinse | Coating Thickness (mils) | Total Width Creepback (mm) | | | Gravel Rating | |
|---|---|---|---|---|---|---|
| | | Average | Maximum | Minimum | Before | After |
| 0.5% H$_2$ZrF$_6$ | 0.53 | 1.5 | 3.1 | 0.2 | 8 | 8 |
| pH 5 | 0.69 | 0.6 | 1.9 | 0.2 | 8 | 8 |
| CoZrF$_6$ | 0.61 | 0.7 | 2.6 | 0.2 | 8 | 8 |
| 4.5 g/L | 0.52 | 0.4 | 3.1 | 0.2 | 8 | 8 |

TABLE 4

(40 Cycles GM 9540 P, Cycle B, on Cold Rolled Steel)

| Rinse | Coating Thickness (mils) | Total Width Creepback (mm) | | | Field |
|---|---|---|---|---|---|
| | | Average | Maximum | Minimum | |
| 0.5% H$_2$ZrF$_6$ | 0.8 | 6.6 | 9.8 | 4.2 | 10% |
| pH 5 | 0.8 | 6.5 | 9.5 | 3.8 | rusted |
| CoZrF$_6$ | 0.8 | 12.1 | 22.6 | 4.5 | 20% |
| 4.5 g/L | 0.9 | 9.6 | 14.8 | 3.9 | rusted |

TABLE 5

(40 Cycles Gm 9540 P, Cycle B, on Galvanized Steel)

| Rinse | Coating Thickness (mils) | Total Width Creepback (mm) | | | Field |
|---|---|---|---|---|---|
| | | Average | Maximum | Minimum | |
| 0.5% H$_2$ZrF$_6$ | 0.41 | 0.7 | 4.2 | 0.2 | 60% |
| pH 5 | 0.44 | 1.0 | 2.7 | 0.2 | rusted |
| CoZrF$_6$ | 0.63 | 0.7 | 2.2 | 0.2 | 10% |
| 4.5 g/L | 0.66 | 0.8 | 2.6 | 0.2 | rusted |

TABLE 6

(5 cycles GM 9505 P, Cycle J, on Cold Rolled Steel)

| Rinse | Coating Thickness (mils) | Maximum Creepback from Scribe (mm) | | |
|---|---|---|---|---|
| | | Right | Left | Total |
| 0.5% H$_2$ZrF$_6$ | 0.9 | 2.6 | 2.9 | 5.5 |
| pH 5 | 0.8 | 2.7 | 2.8 | 5.5 |
| CoZrF$_6$ | 0.8 | 3.4 | 3.0 | 6.4 |
| 4.5 g/L | 0.8 | 2.4 | 2.9 | 5.3 |

TABLE 7

(5 Cycles GM 9505 P, Cycle J, on Galvanized Steel)

| Rinse | Coating Thickness (mils) | Maximum Creepback from Scribe (mm) | | |
|---|---|---|---|---|
| | | Right | Left | Total |
| 0.5% H$_2$ZrF$_6$ | 0.52 | 2.8 | 3.1 | 5.9 |
| pH 5 | 0.60 | 3.0 | 2.7 | 5.7 |
| CoZrF$_6$ | 0.57 | 0.2 | 0.2 | 0.4 |
| 4.5 g/L | 0.47 | 0.2 | 0.2 | 0.4 |

NaCl solution at room temperature for 15 minutes, followed by (4) ambient drying for 75 minutes. The samples are then (5) held for 22.5 hours in a humidity chamber at 85% relative humidity ("RH") and 60° C. The foregoing is generally conducted over a 5-day period after which the 5 steps may be repeated for any desired number of cycles.

2. Cyclic Corrosion—GM 9540P, Cycle B

After preparation, the samples are treated at 25° C. and 50% RH environment for 8 hours, including 4 sprays at 90 minutes intervals with a solution containing 0.9% NaCl, 0.1% CaCl$_2$, and 0.25% NaHCO$_3$ in deionized water. The samples are then subjected to an 8 hour fog, 100% RH at 40° C., followed by 8 hours at 60° C. and less than 20% RH. The entire treatment is repeated for the desired number of cycles, usually 40 cycles.

3. Cyclic Corrosion—GM 9505P, Cycle J

After preparation, the samples are (1) held in a freezer at −30° C. for 2 hours, followed by ambient conditions for 2 hours and subsequently (2) in an oven at 70° C. for 2 hours. The samples are then (3) subjected to a 5% NaCl solution salt spray for 2 hours and then (4) held in a humidity chamber at 38° C. and 95% RH for 64 hours. The samples are then (5) held in an oven at 60° C. for 1 hour followed by (6) a freezer at −30° C. for 30 minutes. The samples are then subjected to (7) immersion in a 5% NaCl solution at room temperature for 15 minutes and then (8) held at ambient conditions for 1.25 hours, followed by (9) a humidity chamber at 60° C. and 85% RH for 6.5 hours, followed (10) by 38° C. for 64 hours. Steps (1)–(4) above are then repeated to complete the cycle which is generally concluded in a 2-week period.

The invention claimed is:

1. A process of retaining or enhancing the corrosion resistance of a cured autodeposited coating on a metallic surface, said process comprising contacting an uncured autodeposited poly(vinylidene chloride) polymer or copolymer coating present on a metallic surface with an aqueous rinse containing from about 0.05 to about 20.0% by weight of hydrofluorozirconic acid or a salt thereof.

2. A process as defined in claim 1 wherein the aqueous rinse contains about 0.5% to about 5.0% by weight of hydrofluorozirconic acid or its salt.

3. A process as defined in claim 1 wherein a nickel or cobalt salt of hydrofluorozirconic acid is present in the aqueous rinse.

4. A process as defined in claim 3 wherein the aqueous rinse contains about 4.5 g/L of the cobalt salt of hydrofluorozirconic acid.

5. A process as defined in claim 1 wherein the metallic surface is cold rolled steel.

6. A process as defined in claim 1 wherein the metallic surface is galvanized steel.

7. A process as defined in claim 1 wherein the pH of the aqueous rinse is about 3 to about 5.

8. A process as defined in claim 5 wherein the pH of the aqueous rinse is about 3.5 and the aqueous rinse contains about 4.5 g/L of a cobalt salt of hydrofluorozirconic acid.

9. A process as defined in claim 1, wherein the polymers or copolymers in the autodeposited coating are selected from the group consisting of copolymers that comprise polymerization residues of:
   (1) from about 45 to about 99 weight percent, based on the total weight of monomers, of vinylidene chloride monomer;
   (2) from about 0.5 to about 30 weight percent, based on the total weight of (1) and (2), of a second relatively more hydrophilic ethylenically unsaturated monomer which has a solubility in both the water phase and the oil phase of the polymer latex of at least 1 weight percent; and
   (3) from about 0.1 to about 5 weight percent, based on the total weight of other monomers, of an ionic, water-soluble monomer which is copolymerizable with (2) and is selected from the group of sulfonic acids and their salts having the formula:

$R-Z-Q-(SO_3)^-M^+$, wherein R is selected from the group consisting of vinyl and substituted vinyl; Z represents a difunctional linking group which will activate the double bond in the vinyl group; Q is a divalent hydrocarbon having its valence bonds on different carbon atoms; and $M^+$ represents a cation.

10. A process as defined in claim 2, wherein the polymers or copolymers in the autodeposited coating are selected from the group consisting of copolymers that comprise polymerization residues of:
    (1) from about 45 to about 99 weight percent, based on the total weight of monomers, of vinylidene chloride monomer;
    (2) from about 0.5 to about 30 weight percent, based on the total weight of (1) and (2), of a second relatively more hydrophilic ethylenically unsaturated monomer which has a solubility in both the water phase and the oil phase of the polymer latex of at least 1 weight percent; and
    (3) from about 0.1 to about 5 weight percent, based on the total weight of other monomers, of an ionic, water-soluble monomer which is copolymerizable with (2) and is selected from the group of sulfonic acids and their salts having the formula:

$R-Z-Q-(SO_3)^-M^+$, wherein R is selected from the group consisting of vinyl and substituted vinyl; Z represents a difunctional linking group which will activate the double bond in the vinyl group; Q is a divalent hydrocarbon having its valence bonds on different carbon atoms; and $M^+$ represents a cation.

11. A process as defined in claim 4, wherein the polymers or copolymers in the autodeposited coating are selected from the group consisting of copolymers that comprise polymerization residues of:
    (1) from about 45 to about 99 weight percent, based on the total weight of monomers, of vinylidene chloride monomer;
    (2) from about 0.5 to about 30 weight percent, based on the total weight of (1) and (2), of a second relatively more hydrophilic ethylenically unsaturated monomer which has a solubility in both the water phase and the oil phase of the polymer latex of at least 1 weight percent; and
    (3) from about 0.1 to about 5 weight percent, based on the total weight of other monomers, of an ionic, water-soluble monomer which is copolymerizable with (2) and is selected from the group of sulfonic acids and their salts having the formula:

$R-Z-Q-(SO_3)^-M^+$, wherein R is selected from the group consisting of vinyl and substituted vinyl; Z represents a difunctional linking group which will activate the double bond in the vinyl group; Q is a divalent hydrocarbon having its valence bonds on different carbon atoms; and $M^+$ represents a cation.

12. A process as defined in claim 7, wherein the polymers or copolymers in the autodeposited coating are selected from the group consisting of copolymers that comprise polymerization residues of:
    (1) from about 45 to about 99 weight percent, based on the total weight of monomers, of vinylidene chloride monomer;
    (2) from about 0.5 to about 30 weight percent, based on the total weight of (1) and (2), of a second relatively more hydrophilic ethylenically unsaturated monomer which has a solubility in both the water phase and the oil phase of the polymer latex of at least 1 weight percent; and
    (3) from about 0.1 to about 5 weight percent, based on the total weight of other monomers, of an ionic, water-soluble monomer which is copolymerizable with (2) and is selected from the group of sulfonic acids and their salts having the formula:

$R-Z-Q-(SO_3)^-M^+$, wherein R is selected from the group consisting of vinyl and substituted vinyl; Z represents a difunctional linking group which will activate the double bond in the vinyl group; Q is a divalent hydrocarbon having its valence bonds on different carbon atoms; and $M^+$ represents a cation.

13. A process of retaining and enhancing the corrosion resistance of a cured autodeposited poly(vinylidene chloride) polymer or copolymer coating on a metallic surface, said process comprising contacting an uncured autodeposited poly(vinylidene chloride) polymer or copolymer coating on a metallic surface with an aqueous rinse solution having a pH of about 3 to about 5 and containing from about 0.05 to about 5.0% by weight of hydrofluorozirconic acid or a salt thereof, said cured autodeposited polymer or copolymer coating having a thickness of from about 0.3 to about 1 mil.

14. A process as defined in claim 13 wherein the cured autodeposited polymer or copolymer coating has a thickness of about 0.6 to about 1.0 mil.

15. A process as defined in claim 9 wherein the metallic surface is selected from the group consisting of cold rolled steel and galvanized steel.

16. A process as defined in claim 13 wherein the metallic surface having the uncured autodeposited coating thereon is contacted with the aqueous rinse by immersion.

17. A process as defined in claim 16 in which a cold rolled steel and a galvanized steel metallic surface, each having an uncured autodeposited coating thereon, are simultaneously immersed in the aqueous rinse solution.

18. A process as defined in claim 16 in which the time of contact with the aqueous rinse by immersion is from about 40 to about 120 seconds.

19. A process as defined in claim 18 wherein the aqueous rinse contains about 4.5 g/L of cobalt salt of hydrofluorozirconic acid.

20. A process as defined in claim 9, wherein the polymers or copolymers in the autodeposited coating are selected from the group consisting of copolymers that comprise polymerization residues of:
 (1) from about 45 to about 99 weight percent, based on the total weight of monomers, of vinylidene chloride monomer;
 (2) from about 0.5 to about 30 weight percent, based on the total weight of (1) and (2), of a second relatively more hydrophilic ethylenically unsaturated monomer which has a solubility in both the water phase and the oil phase of the polymer latex of at least 1 weight percent; and
 (3) from about 0.1 to about 5 weight percent, based on the total weight of other monomers, of an ionic, water-soluble monomer which is copolymerizable with (2) and is selected from the group of sulfonic acids and their salts having the formula:

$$R-Z-Q-(SO_3)^-M^+,$$

wherein R is selected from the group consisting of vinyl and substituted vinyl; Z represents a difunctional linking group which will activate the double bond in the vinyl group; Q is a divalent hydrocarbon having its valence bonds on different carbon atoms; and $M^+$ represents a cation.

* * * * *